United States Patent [19]

Nahon

[11] 4,005,548
[45] Feb. 1, 1977

[54] PLANT SUPPORT

[76] Inventor: Abraham S. Nahon, 1026 Arboretum Road, Wyncote, Pa. 19095

[22] Filed: July 2, 1975

[21] Appl. No.: 592,395

[52] U.S. Cl. ............................ 47/45; 182/179; 211/189; 248/27.8; 256/65; 403/206
[51] Int. Cl.² ........................... A01G 17/06
[58] Field of Search ............... 47/47, 45, 46; 256/DIG. 3, DIG. 5, 19, 20, 44, 46, 47, 48, 50, 52, 54, 58, 65, 66, 68; 248/27.8, 156, 407, 408, 175; 211/104, 178, 181, 183, 189, 190, 191, 192, 193, 194, 195, 196, 197, 198, 199, 200, 201, 202, 203; 182/92, 104, 111, 120, 179; 403/206, 209, 233; 52/648

[56] References Cited

UNITED STATES PATENTS

| 197,054 | 11/1877 | Redmond | 256/DIG. 5 |
|---|---|---|---|
| 374,906 | 12/1887 | Rovane | 47/47 |
| 546,167 | 9/1895 | Leonard | 47/47 |
| 669,050 | 2/1901 | Swartz | 256/44 |
| 1,720,004 | 7/1929 | Rich | 256/DIG. 5 |
| 2,024,546 | 12/1935 | Starkey | 47/47 |
| 2,124,049 | 7/1938 | Battista et al. | 47/47 |
| 2,364,419 | 12/1944 | Barnes | 256/58 |
| 2,763,096 | 9/1956 | Roger | 47/47 |

FOREIGN PATENTS OR APPLICATIONS

| 313,324 | 4/1956 | Switzerland | 47/47 |
|---|---|---|---|
| 234,225 | 5/1925 | United Kingdom | 47/47 |

*Primary Examiner*—Edgar S. Burr
*Assistant Examiner*—James R. Feyrer
*Attorney, Agent, or Firm*—Weiser, Stapler & Spivak

[57] ABSTRACT

A plant support comprising a plurality of interchangeable upright support rods each of which is provided with a plurality of longitudinally spaced cross wire holders. A plurality of identical, interchangeable, cross wires are each endwardly equipped with support rod engaging bent ends of size to slidingly overfit the upright rods. The cross wire ends are formed to a generally C-shaped configuration to define gaps of size to permit the cross wires to slide past the spaced holders on the support rods. By vertically spacing the cross wires relative to the support rods with the end openings aligned with the holders, the cross wires can slide vertically relative to the support rod to desired, vertically spaced locations. With the cross wires vertically spaced as desired, the support rods may then be rotated sufficiently to move the holders out of vertical alignment with the cross wire end openings to thereby lock the plurality of cross wires upon the support rods in vertically spaced relationship.

22 Claims, 12 Drawing Figures

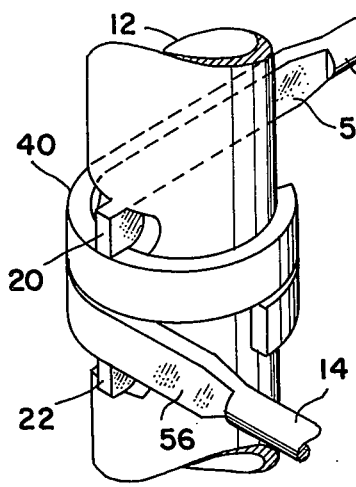
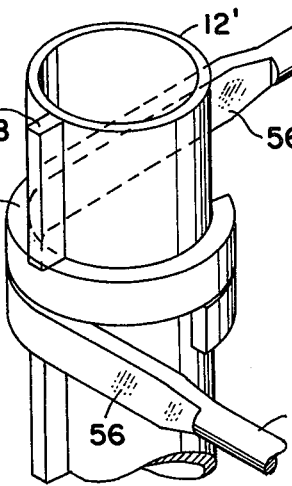
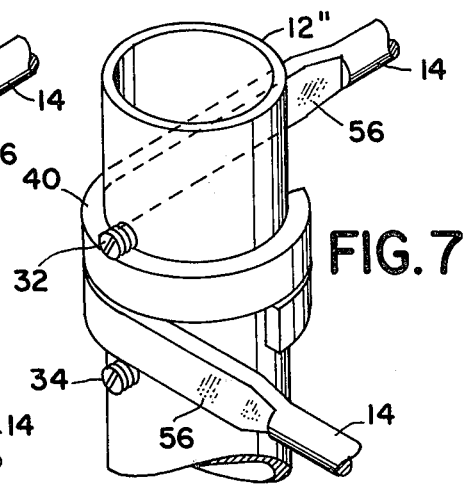
FIG.5  FIG.6  FIG.11
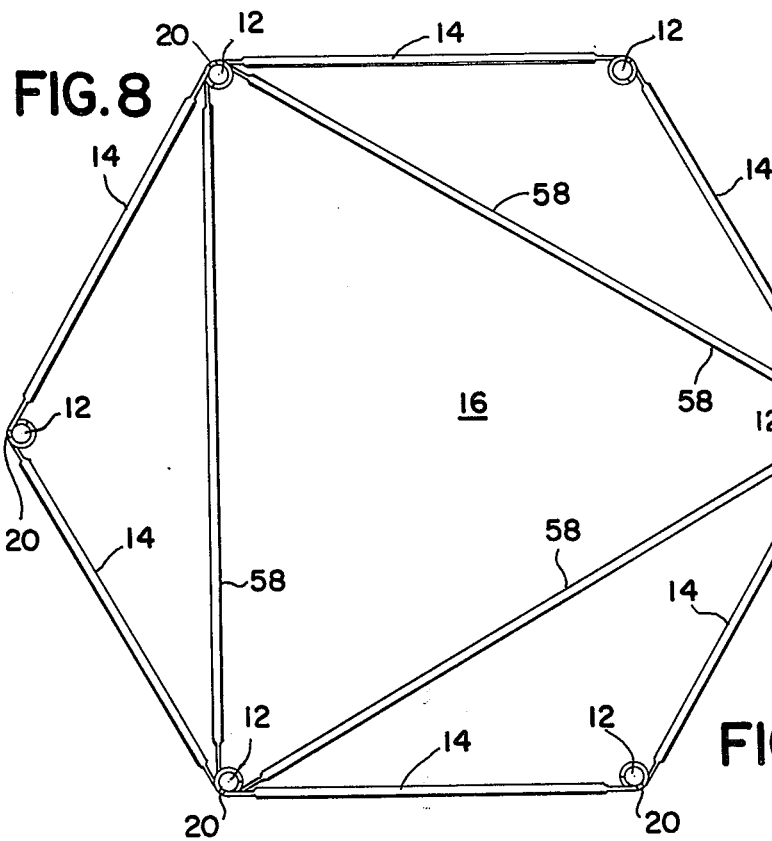
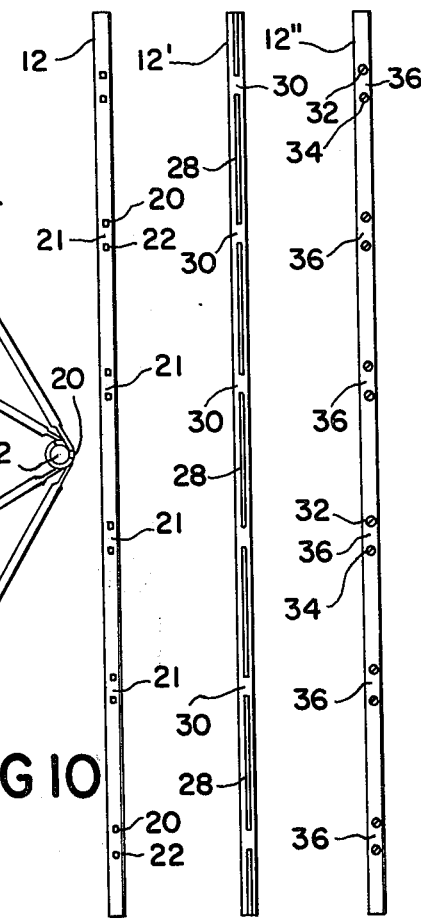
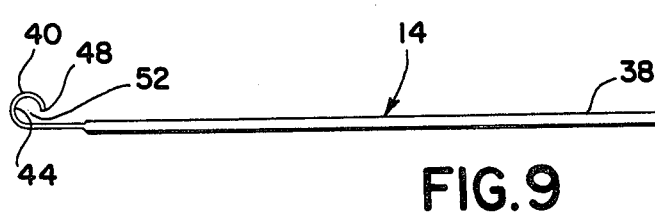
FIG.8  FIG.10  FIG.12  FIG.9

PLANT SUPPORT

BACKGROUND OF THE INVENTION

This invention relates generally to the field of plant supports, and more particularly is directed to a foldable construction comprising a plurality of two basic interchangeable elements.

When growing vegetable plants, particularly plants of the vine type such as tomatoes it has been the common practice to provide some method of elevating the plant as it grows to prevent the fruit from contacting the ground and thus spoiling. Prior workers in the field have employed such simply constructed devices as elongated stakes which can be set in the ground adjacent the plant and then the plant is tied to the stake as it grows. This type of device is generally unsatisfactory in that it requires considerable maintenance and that it is quite difficult to tie the branches to the stake for support purposes.

Other workers in the field have attempted to encircle the plant with a semi-rigid type of construction to thereby provide support for the branches as the plant grows. Most encircling type of supports have been simply constructed of wire fencing materials which are cut to size, rolled to a cylindrical form and then tied to thereby provide a cylindrical plant support. Such wire type supports are generally satisfactory when in use and well serve the purpose of supporting the branches of the plant as it grows within the area defined by the circular side wall construction. However, difficulties arise after completion of the growing season when it is desired to store the cylindrically formed material for use during next growing season. The cylindrical nature of the device provides a bulky, space consuming construction which requires an inordinately large area during the winter months to simply store a plurality of such plant supports. When the prior workers have attempted to open the cylindrical retainers to thus store the wire fencing in flat form, it has been found that considerable time and effort must be spent to uncurl the cylindrically formed material prior to achieving a relatively flat configuration. Also, after flattening the previously cylindrically bent wire fabric, the cut wire ends provide a plurality of relatively sharp points which could cause painful and even dangerous cuts when attempting to straighten and store the material.

SUMMARY OF THE INVENTION

The present invention relates to a plant support of the prefabricated type which employs a plurality of two basic interfitting shapes, namely, a plurality of upright support rods and a plurality of cross wires which removably connect adjacent support rods.

The support rods of the present invention are fabricated to provide a plurality of vertically spaced, identical, cross wire holding means of a type suitable to permit the cross wires to slide vertically relative to the upright support rods to a desired location. The support rods further include means to lock the cross wires at desired, vertically spaced locations. The wire locking means can include a plurality of vertically spaced pairs of projections in a preferred embodiment, which projections are vertically aligned on each support rod to permit the cross wires to slide longitudinally relative to the support rods in a first position and to lock the cross wires in longitudinally spaced locations when the support rods are rotated to a second position. The projections may be swaged to project outwardly from the outer periphery of the upright rods or may be formed of machined fasteners, such as threaded set screws which are designed to project outwardly from the outer periphery of the support rods.

In an alternate method of construction, the holding means can include a longitudinally extending, elongated ridge which projects outwardly from the outer periphery of each support rod. In this embodiment, the ridge would be provided with a plurality of longitudinally spaced openings suitable to lock the cross wires therewithin when the support rod is moved from a first position to a second position to thereby lock the cross wires in the desired places.

It is an object of the present invention to provide an improved plant support of the type set forth.

It is another object of the present invention to provide a novel plant support comprising a plurality of interfitting parts consisting of two basic shapes, namely a plurality of support rods and a plurality of cross wires interconnecting adjacent support rods.

Is is another object of this invention to provide a novel plant support including a plurality of support rods, a plurality of cross wires and holding means longitudinally spaced along the support rods to receive and retain cross wires.

It is another object of the present invention to provide a novel plant support including means to form a rigid structure defining a plant growing area therewithin and further including means to flatten the support to a generally planar configuration for storage when not in use.

It is another object of the present invention to provide a novel plant support including support rods, a plurality of spaced pairs of projections projecting from each rod and defining cross wire holding means, cross wires including bent ends provided with gaps which are longitudinally slidable along the support rods when the gaps are aligned with the projections, the cross wires sliding past the projections when the support rods are in a first position and the cross wires being locked within the holding means when the support rods are rotated to a second position.

It is a further object of this invention to provide an improved plant support that is inexpensive in manufacture, simple in design and trouble free when in use.

Other objects and a fuller understanding of the invention will be had by referring to the following description and claims of the preferred embodiment thereof, taken in conjunction with the accompanying drawings, wherein like reference characters refer to similar parts throughout the several views and in which:

BRIEF DESCRIPTION OF THE DRAWINGS

FIG. 5 is a view similar to FIG. 2 showing the cross wires in locked position.

FIG. 6 is a perspective view similar to FIG. 3 showing the cross wires in locked position.

FIG. 7 is a perspective view similar to FIG. 4 showing the cross wires in locked position.

FIG. 8 is a cross sectional view taken along Line 8—8 of FIG. 1, looking in the direction of the arrows.

FIG. 9 is a side elevational view of a single cross wire.

FIG. 10 is a side elevational view of a support rod fabricated to include the holding means illustrated in FIGS. 2 and 5.

FIG. 11 is a side elevational view of a modified support rod fabricated to include the holding means illustrated in FIGS. 3 and 6.

FIG. 12 is a side elevational view of a modified support rod fabricated to include the holding means illustrated in FIGS. 4 and 7.

DESCRIPTION OF THE PREFERRED EMBODIMENT OF THE INVENTION

Figure 1:
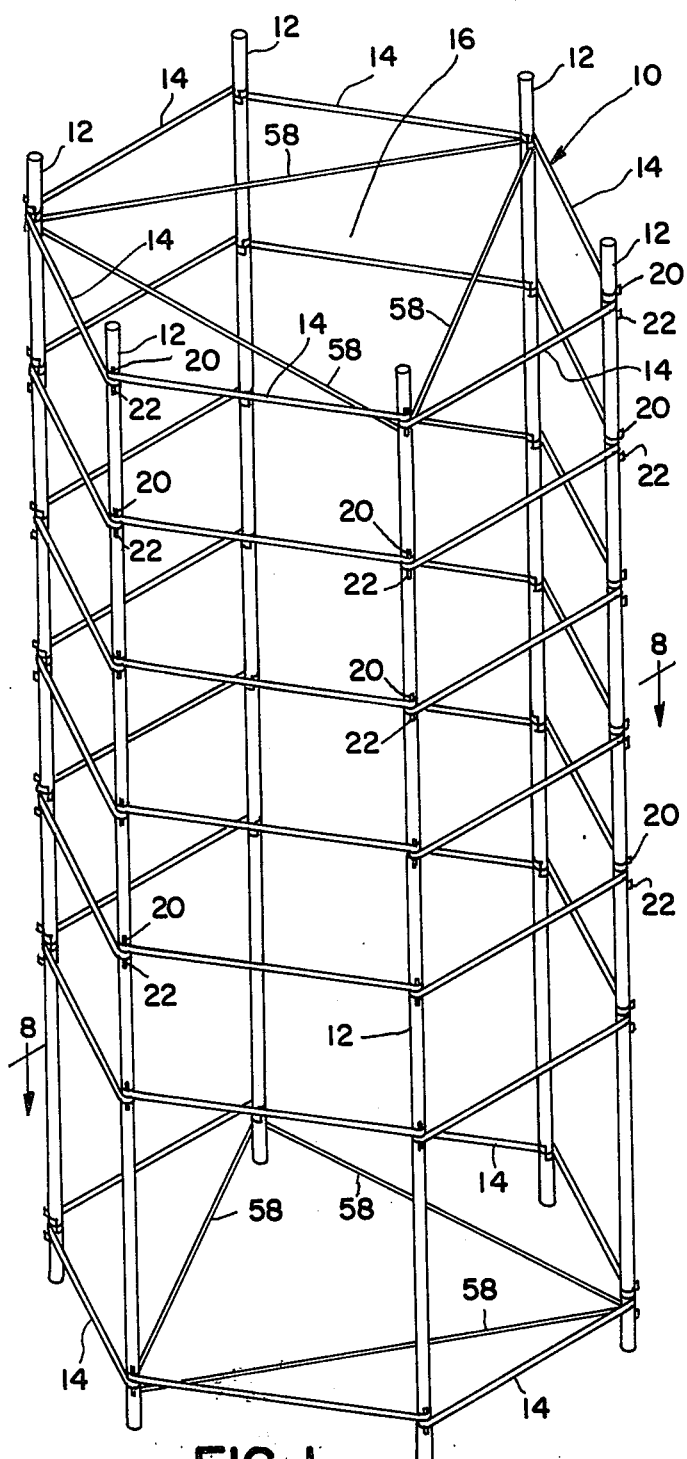
FIG. 1 is a perspective view of an assembled plant support constructed in accordance with the present invention.

Although specific terms are used in the following description for the sake of clarity, these terms are intended to refer only to the particular structure of my invention selected for illustration in the drawings, and are not intended to define or limit the scope of the invention.

Referring now to the drawings, in FIG. 1 is shown a plant support generally designated 10 which comprises a plurality of vertically positioned, upright support rods 12 and a plurality of generally horizontally arranged cross wires 14 which extend between adjacent support rods 12. The rods may be solid or hollow and preferably are fabricated of galvanized steel. In the embodiment illustrated, six support rods 12 are vertically arranged in the general form of a hexagonal cross sectional pattern to define an interior plant growing space 16 therewithin. If three support rods were employed, a triangular cross sectional pattern would be defined; four support rods would define a rectangular cross sectional configuration; five support rods would define a pentagonal cross sectional configuration, and so forth.

Each support rod 12 is provided with a plurality of vertically spaced cross wire holding means along its length of suitable construction to permit the cross wires 14 to slide longitudinally relative to the support rods for assembly purposes and to lock in spaced, longitudinal locations when the device is in use.

Figure 2:
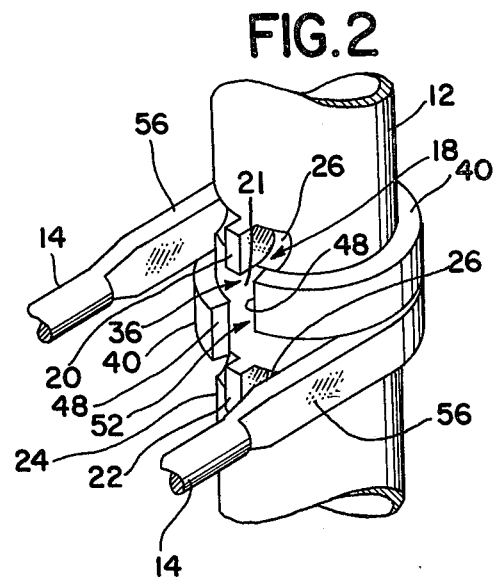
FIG. 2 is an enlarged, partial, perspective view showing the application of cross wires upon a vertical support rod.

As best seen in FIG. 2, the cross wire holding means 18 may be in the form of a plurality of pairs of longitudinally spaced, swaged projections 20, 22 which may be raised from the outer periphery 24 of the support rod 12 by displacing portions of the rod material itself, such as by defining the indentations adjacent the projections 20, 22. The longitudinal space 21 defined between each pair of projections 20, 22 should be sufficient to receive therein the ends of two cross wires for locking purposes as hereinafter more fully set forth.

Figure 3:
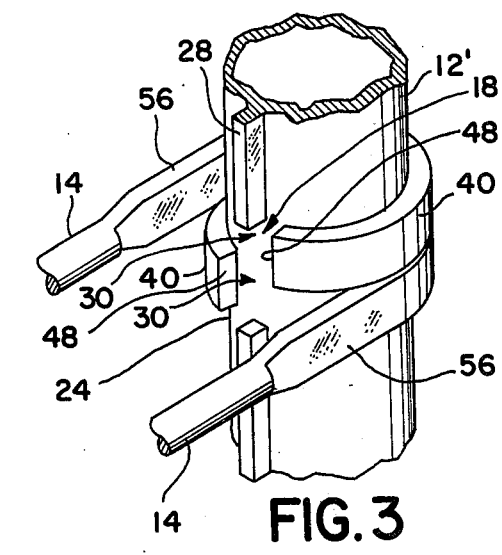
FIG. 3 is a view similar to FIG. 2 showing a modified holding means construction.

In the embodiment illustrated in FIG. 3, the support rods 12' are provided with a longitudinally extending, radially outwardly projecting spine or ridge 28 which extends substantially the entire length of the modified support rod 12'. At a plurality of vertically spaced locations along the spine 28, the spine material is cut or otherwise removed to define a plurality of spaced openings 30, wherein the ridge material is removed to expose the outer periphery 24' of the support rod 12'λ within the space defined at the opening 30. Each opening 30 extends in height a distance sufficient to receive therein the ends of two cross wires 14 for locking purposes as hereinafter more fully set forth.

Figure 4:
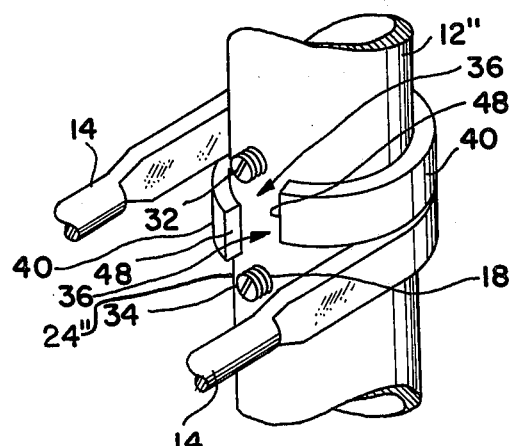
FIG. 4 is a view similar to FIG. 2 showing a second modified holding means construction.

In the embodiment illustrated in FIG. 4, the cross wire holding means 18 comprises a plurality of pairs of set screws 32, 34 which are turned into or otherwise secured to the modified support rod 12'' in a plurality of vertically spaced pairs. The set screws 32, 34 define an open area 36 therebetween of sufficient height to receive the end portions of two cross wires 14 therein for cross wire locking purposes in the manner hereinafter more fully set forth.

As illustrated in FIG. 9, each cross wire 14 is formed with a relatively straight medial section 38 which preferably is in the form of solid, round, metallic wire. The medial section 38 terminates endwardly in bent ends 40, 42 which preferably are integrally formed. Each end 40, 42 bends inwardly toward the medial portion in a generally circular loop 44, 46 of diameter suitable to receive therein a vertical support rod 12 in a relatively tight, sliding engagement. Each loop 44, 46 terminates in an end 48, 50 which is spaced from the medial portion 38 sufficiently to define a respective gap 52, 54 of size to slide past the cross wire holding means 18 whether they be projections (FIG. 10), a spine (FIG. 11) or set screws (FIG. 12), as the cross wires 14 are applied to the support rods 12, 12' or 12''. The cross wires may also be fabricated of cotter pin wire or other similar wire of half round cross sectional configuration or of round edge flat wire wherein the flat surface may be utilized for bearing against the upright support rods 12.

As best seen in FIGS. 2, 3 and 4, when assembling or disassembling the device, the cross wires 14 are positioned relative to the support rods 12 to align the end openings 52 or 54 with the cross wire holding means which may be in the form of swaged projections 20, 22 (FIGS. 2 and 10), a vertically extending spine (FIGS. 3 and 11) or a plurality of vertically spaced pairs of set screws 32, 34 (FIGS. 4 and 12).

Preferably, each of the cross wire bent ends 40, 42 are flattened to provide the bent loops 44, 46 of generally rectangular cross section configuration having a vertical dimension which is greater than the diameter of the medial portion 38 of the cross wire 14. In this manner, a generally flat surface 56 is applied against the outer periphery 24, 24', 24'' of the support rod 12, 12', 12''. The flat surface 56 provides increased bearing surface between the parts to thereby impart greater stability to the device when in use.

In order to fabricate the plant support 10 of the present invention, place a cross wire 14 with the gap 52 or 54 facing outwardly and a second cross wire 14 with the gap 52, 54 facing inwardly and insert a support rod 12 through the loops 44 or 46. Then slide the two cross wires to the lowest set of projections 20, 22 as in FIG. 2 and then lock in position by revolving the support rod 12 as in FIG. 5. Repeat this procedure until two cross wires are locked in each holding means 18. In the case of a six support rod structure, three similar assemblies should be formed.

Place two of the assemblies side by side on a table or workbench (not shown) and connect them together at each end with a spacer wire. The upper wire at each holding means of the right assembly and the lower cross wire at each holding means of the left assembly are joined by feeding the bottom of another support rod 12 through the respective cross wire loops. It will be noted that the cross wire gaps 52, 54 permit the passage of the projections 20, 22 when the projections and openings are aligned. When all of the cross wire loops 40, 42 are seated within a holding means, the rod 12 can then be rotated to lock the construction.

Then place the remaining assembly next to the first two assemblies and connect with a spacer wire at each end and assemble in the manner previously described.

Turn the entire assembly upside down and position the cross wires to receive the last support rod. Feed the support rod through the cross wire loops and then lock in position by rotating the support rod relative to the cross wires.

Stand the plant support upright, and remove the spacer wires. Place the stabilizer wires 58 as indicated in FIG. 1 at both top and bottom and the plant support 10 is then ready for use.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited to the foregoing specification but rather only by the scope of the claims appended hereto.

I claim:
1. A plant support comprising
   A. at least three cylindrical support rods each having a longitudinal axes and a peripheral surface,
   B. a plurality of cross wire holding means extending from the support rods,
      1. said holding means being longitudinally spaced along the support rods,
      2. some of said holding means defining a cross wire receiving opening therebetween,
      3. said cross wire receiving opening extending outwardly from the support rod,
      4. said cross wire receiving opening being open outwardly from the support rod and being closed at the support rod;
   C. a plurality of cross wires interconnecting adjacent support rods at the holding means,
      1. said cross wires comprising a medial portion and bent ends the bent ends being slidable upon said support rods, said support rods being rotatable in said bent ends,
      2. the bent ends defining openings between the ends and the medial portion,
      3. the openings being of a size to receive therein the holding means.
2. The plant support of claim 1 wherein the holding means comprise projections extending from a support rod, the said projections lying within parallel, longitudinally aligned planes drawn tangentially to the peripheral surface.
3. The plant support of claim 2 wherein the holding means comprise a plurality of pairs of projections extending outwardly from the peripheral surface of the rod.
4. The plant support of claim 2 wherein the projections comprise a longitudinally aligned ridge member extending outwardly from the peripheral surface of the rod, the ridge member being cut at a plurality of vertically spaced locations to define a plurality of spaced openings of size to receive a cross wire bent end therewithin.
5. The plant support of claim 2 wherein the cross wire gaps do not align with the projections when the cross wires interconnect support rods.
6. The plant support of claim 4 wherein the spaced openings are of size to receive two cross wire bent ends therewithin.
7. In a plant support, the combination of
   A. a plurality of elongated support rods, each rod having a peripheral surface,
      1. at least some of the support rods comprising a plurality of longitudinally spaced holding means to support cross wires,
         a. said holding means comprising projections extending from the rod surface, some of said projections defining a cross wire receiving area therebetween;
   B. a plurality of cross wires interconnecting adjacent support rods between at least some of the holding means,
      1. the cross wires comprising a medial section and endwardly positioned bent ends including a gap
      2. the ends slidably engaging the rods at the said holding means and being engaged within a said cross wire receiving area; and
   C. said support rods being rotatable in said bent ends, selectively to position said holding means in alignment with said gap, said bent ends being slidable along said support rods only when said holding means are in alignment with said gap to position a bent end within a desired cross wire receiving area, whereby a free standing support apparatus is provided
8. The plant support of claim 7 wherein the holding means comprise a plurality of projections projecting outwardly from the outer periphery of at least some of the rods, at least some of said projections on a rod being positioned in the same vertical plane.
9. The plant support of claim 7 wherein the projections are arranged in longitudinally spaced pairs, the said pairs defining the cross wire retaining area therebetween.
10. The plant support of claim 9 wherein at least some of the projections comprising a pair are spaced apart sufficiently to receive one bent end of each of two cross wires therebetween.
11. The plant support of claim 9 wherein the projections comprising a pair are positioned in the same vertical plane.
12. The plant support of claim 9 wherein at least some of the said cross wire receiving areas are of sufficient height to receive the ends of two cross wires therewithin.
13. The plant support of claim 7 wherein the projections form openings and at least some of the cross wire bent ends define openings, the gaps being of sufficient size to permit a said projection to pass therethrough.
14. The plant support of claim 13 wherein the projections comprise pairs of members engaged into the rod construction, the projections on a support rod being positioned into the same plane whereby a cross wire may be moved lengthwise along the length of the support rod by aligning the bent end gap with the projections.
15. The plant support of claim 7 wherein the holding means comprise a longitudinally extending ridge, the ridge being provided with a plurality of longitudinally spaced openings, the openings receiving therein an end of a cross wire, at least some of the openings extending from the top of the ridge to the peripheral surface of the rod.

16. The plant support of claim 15 wherein at least some of the openings define a space between adjacent parts of the ridge of sufficient height to receive one bent end of each of two cross wires therebetween.

17. The plant support of claim 7 wherein portions of at least some of the bent ends include a flat surface portions, the flat surface portion being bent to a partial circular configuration, the circular configured portion partially encircling a support rod.

18. The plant support of claim 17 wherein at least part of the flat surface portion contacts a support rod.

19. The plant support of claim 17 wherein the flat surface portion has a vertical dimension greater than the largest vertical dimension of the medial portion.

20. The plant support of claim 17 wherein the bent ends have a vertical dimension to permit two said bent ends to be vertically stacked within one cross wire receiving opening.

21. The method of fabricating a plant support of the type including a plurality of support rods and cross wires including bent ends, comprising the steps of
A. engaging a first cross wire with a support rod by inserting the support rod through a bent end;
B. sliding the cross wire relative to the support rod to place the bent end in a predetermined longitudinal position on the support rod; and
C. rotating the support rod relative to the cross wire to lock the cross wire in the said longitudinal position.

22. The method of claim 21 including the additional steps of engaging a second cross wire bent end with the support rod; sliding the second cross wire bent end to the said longitudinal position on the support rod; and locking both the bent end of the first cross wire and the bent end of the second cross wire in the same said predetermined longitudinal position.

* * * * *